United States Patent
Pope

(10) Patent No.: US 9,735,617 B2
(45) Date of Patent: Aug. 15, 2017

(54) LOAD CONTROL SYSTEM OPERABLE UNDER DIFFERENT POWER SUPPLY CONDITIONS

(71) Applicant: Cree, Inc., Durham, NC (US)

(72) Inventor: Daniel Pope, Morrisville, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/694,669

(22) Filed: Apr. 23, 2015

(65) Prior Publication Data

US 2016/0315499 A1    Oct. 27, 2016

(51) Int. Cl.
| | |
|---|---|
| *H05B 37/00* | (2006.01) |
| *H02J 9/06* | (2006.01) |
| *H05B 33/08* | (2006.01) |
| *H05B 37/02* | (2006.01) |

(52) U.S. Cl.
CPC .......... *H02J 9/061* (2013.01); *H05B 33/0815* (2013.01); *H05B 33/0845* (2013.01); *H05B 37/02* (2013.01)

(58) Field of Classification Search
CPC . H05B 37/02; H05B 33/0815; H05B 33/0845
USPC ................... 315/86, 291, 307, 312
See application file for complete search history.

(56) References Cited

U.S. PATENT DOCUMENTS

| | | | |
|---|---|---|---|
| 6,215,202 B1* | 4/2001 | Luongo .................. | H02J 15/00 307/23 |
| 2008/0191628 A1* | 8/2008 | Marques ................ | H05B 37/04 315/86 |
| 2011/0254454 A1* | 10/2011 | Inoue .................. | H05B 33/0815 315/161 |
| 2012/0043889 A1* | 2/2012 | Recker ............... | H05B 33/0815 315/86 |
| 2013/0249412 A1* | 9/2013 | Nakajima .......... | H05B 33/0887 315/160 |

* cited by examiner

*Primary Examiner* — Tung X Le
(74) *Attorney, Agent, or Firm* — McCracken & Gillen LLC

(57) ABSTRACT

According to one aspect, a load control system responsive to electric power from either a first power source or a second power source operable during first and second time periods, respectively, comprises a first circuit responsive to the first and second power sources to develop power waveforms having different characteristics during the first and second time periods. The load control system further includes a second circuit coupled to the first circuit and responsive to the characteristics of the power developed by the first circuit for developing first and second different outputs during the first and second time periods, respectively.

22 Claims, 4 Drawing Sheets

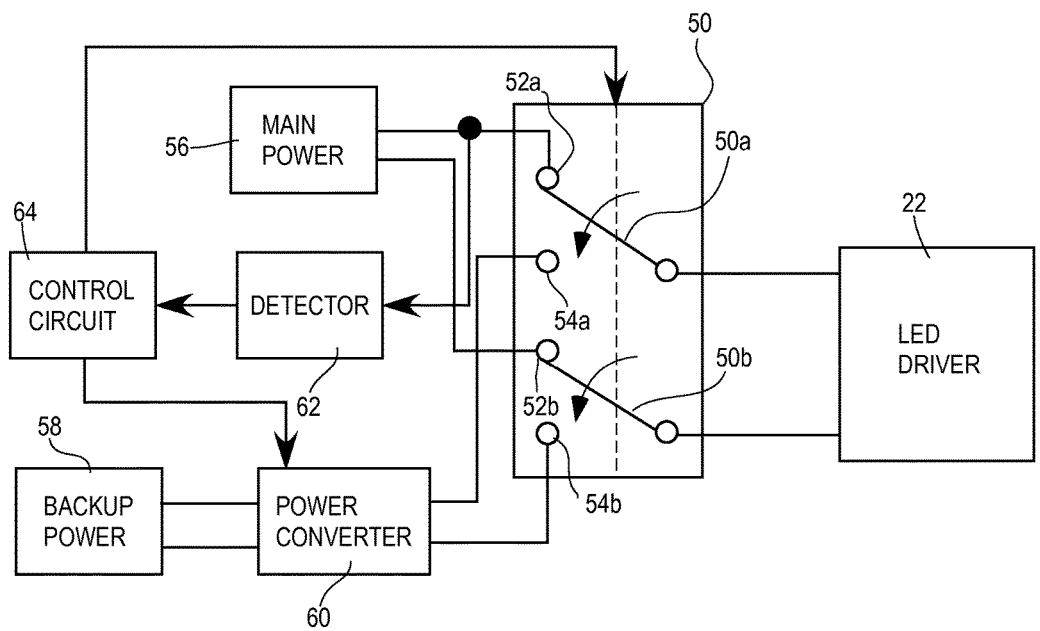
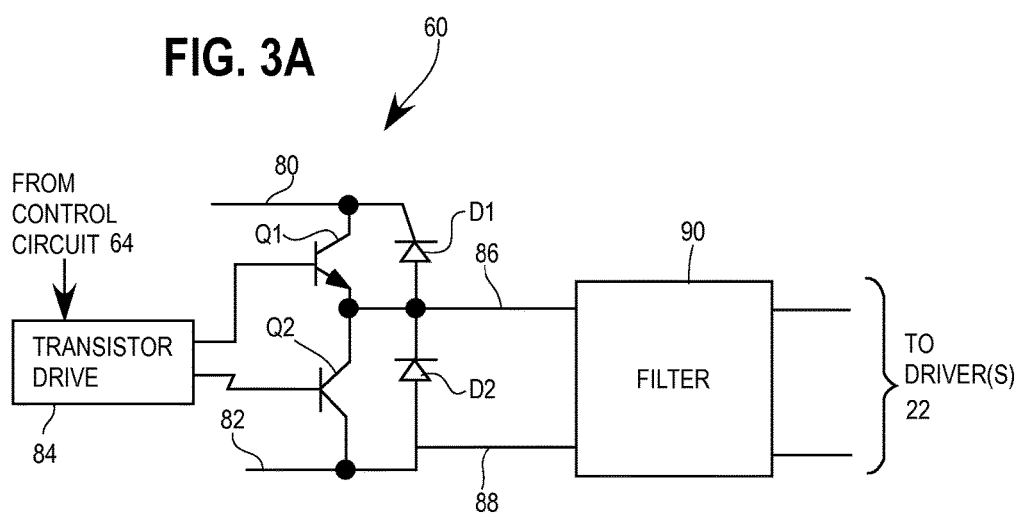

LOAD CONTROL SYSTEM OPERABLE UNDER DIFFERENT POWER SUPPLY CONDITIONS

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to control systems, and more particularly, to load control systems operable under different power supply conditions.

BACKGROUND

Often, electrical loads are operated using a main or usual source of power and a back-up power supply, such as a battery or an uninterruptable power supply (UPS). As is well known, back-up power supplies typically only provide a limited amount of power for a limited time. Accordingly, the loads are often driven at a lower load level when the back-up supply is operative, so that the loads can operate for a longer period of time. Further, it is often desirable to operate the loads in a manner that indicates when the back-up supply is providing power, so that corrective action can possibly be undertaken to restore main power, such as from an electric power utility.

In the case of a lighting load, such as luminaires utilizing LEDs, the load can be operated for a relatively long period of time due to the low power requirement of such a load as compared to other loads. However, even in such a case, it is desirable to operate the load with reduced power output to preserve battery life and to indicate that power is being drained from a limited power source. Accordingly, a known approach to operating a dimmable LED load, for example, in a public location, has been to provide a circuit remote from the LED load and coupled to main and auxiliary (i.e., back-up) power inputs. The circuit provides appropriately conditioned power to the luminaires, and further develops a dimming signal on a dedicated dimming line that commands the luminaires to operate at a fully energized state when main power is being provided and which commands the luminaires at a dimmed state (or operates some of the luminaires in the dimmed state while remaining luminaires are turned off) to preserve power when auxiliary power is being provided. Typically, a relay is activated when the power source is switched from the utility to the back-up power source, and the relay shorts the dimming signal so that the lighting fixture senses 0 volts. Providing 0 volts to the lighting fixture causes the lighting fixture to drive the illumination device at a predetermined minimum output level.

SUMMARY

According to one aspect, a load control system responsive to electric power from either a first power source or a second power source operable during first and second time periods, respectively, comprises a first circuit responsive to the first and second power sources to develop power waveforms having different characteristics during the first and second time periods. The load control system further includes a second circuit coupled to the first circuit and responsive to the characteristics of the power developed by the first circuit for developing first and second different outputs during the first and second time periods, respectively.

According to another aspect, a load control system is responsive to electric power from either a utility power source or a back-up power source operable during first and second time periods, respectively. The load control system includes a first circuit responsive to the utility and back-up power sources to develop power at different frequencies during the first and second time periods and a second circuit coupled to the first circuit and responsive to the frequency of the power developed by the first circuit for developing first and second outputs during the first and second time periods, respectively.

According to yet another aspect, a combination of a load control system and an LED load operated by the control circuit is responsive to electric power from either a utility power source or a back-up power source operable during first and second time periods, respectively. The combination comprises a first circuit responsive to the utility and back-up power sources to develop power at different frequencies during the first and second time periods and a second circuit coupled to the first circuit and responsive to the frequency of the power developed by the first circuit for developing first and second outputs, respectively. A plurality of LEDs is coupled to the second circuit, energized by the first and second outputs, and develops a brightness dependent upon the outputs.

Other aspects and advantages will become apparent upon consideration of the following detailed description and the attached drawings wherein like numerals designate like structures throughout the specification.

BRIEF DESCRIPTION OF THE DRAWINGS

FIG. 3 is a block diagram illustrating each of the controllers of FIGS. 1 and 2 in greater detail;

FIG. 3A is a combined schematic and block diagram of the power converter of FIG. 3;

DETAILED DESCRIPTION

Figure 1:
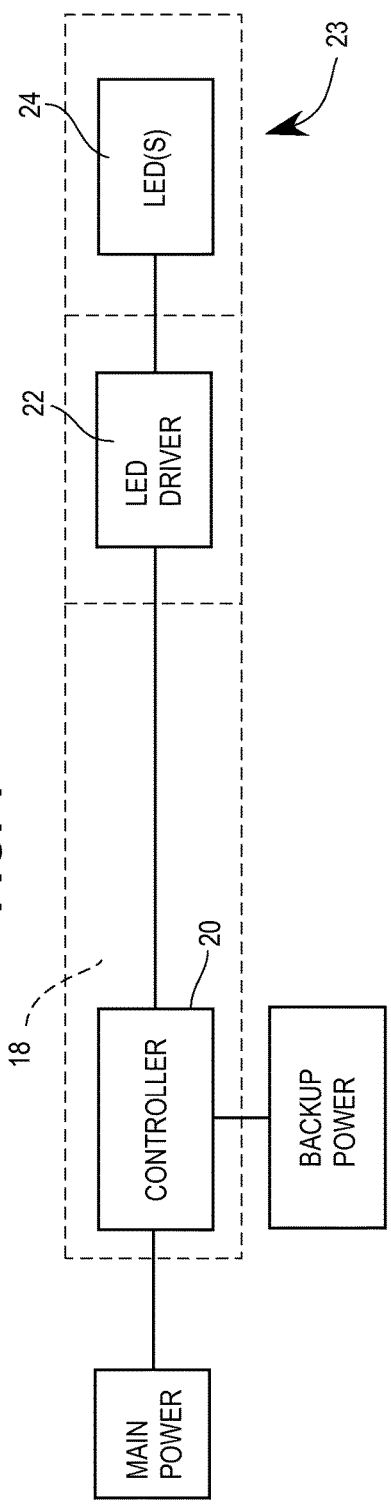
FIG. 1 is a simplified block diagram of a load control system in combination with a first load.

Referring to FIG. 1, a load control system 18 includes a controller 20 that receives main and auxiliary power from first and second power sources, respectively. A power utility company may supply the main power whereas auxiliary power may be supplied by a battery, an ultracapacitor bank, a UPS, or any other source of back-up power. The controller 20 may provide power to a driver circuit 22 forming a part of a luminaire 23. The driver circuit 22, in turn, provides power to one or more loads in the form of one or more LEDs 24 also forming a part of the luminaire 23. The main power supplied to the controller 20 may be conditioned in some fashion before transferring power to the driver circuit 22. For example, the power may be converted to DC power, voltage- or current-shifted, the frequency may be modified, etc. Alternatively, the main power may be directly provided to the driver circuit 22 without conditioning.

Figure 2:
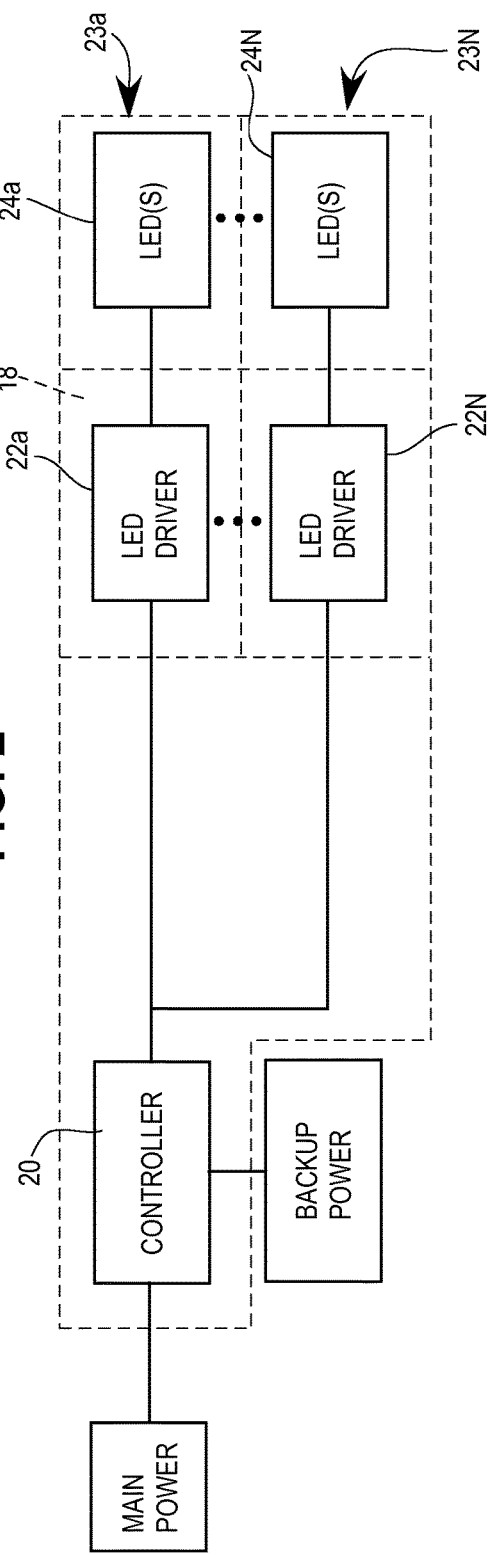
FIG. 2 is a simplified block diagram of a load control system in combination with a second load.

FIG. 2 illustrates an embodiment in which a controller 20a is coupled to multiple driver circuits 22a, 22b, . . . , 22N that in turn develop power for loads such as LEDs 24a, 24b, . . . , 24N, respectively. The driver circuits 22a-22N and LEDs 24a-24N may comprise portions of separate luminaires 23a-23N, respectively, or may be disposed in a single luminaire. The controller 20a of FIG. 3 may be similar or identical to or different than the controller 20 of FIG. 2, and each of the driver circuits 22a, 22b, . . . , 22N of FIG. 3 may be similar or identical to or different than the driver circuit 22 of FIG. 2. In any event, the controller 20a may be replaced by multiple controllers, each of which supplies power to one or more of the driver circuits 22a-22N.

Each of the driver circuits 22 of FIG. 1 or 2 may operate as a constant current source for the LEDs 24 driven thereby. In a commercial (i.e., non-residential) setting, for example, one may wish to operate the LEDs 24 during normal operation in a non-dimming mode when the main power is being supplied to the controller 20 during which operation the LEDs 24 are fully on (i.e., fully energized). However, when auxiliary power is being supplied to the controller 20, one may wish to dim some or all of the LEDs to conserve power and/or to indicate that main power is not being supplied to the controller 20.

In known lighting systems, a dimming signal must be provided over one or more conductors extending between the controller 20 and the driver circuit 22. These conductor(s) are in addition to the conductors that supply power to the driver circuit 22. The present load control system obviates the need for a dedicated dimming signal line as noted in greater detail hereinafter.

Referring next to FIG. 3, the controller 20 according to one embodiment is shown in greater detail, it being assumed in the case of the embodiment shown in FIG. 2 that the controllers 20a-20N are all identical thereto. A relay 50 includes first and second sets of contacts 52, 54, respectively, wherein the first set 52 receives main power, for example from an electric utility company or another main power source 56 and the second set of contacts receives power from a back-up source of power 58, such as a set of batteries, an ultracapacitor bank, an uninterruptible power supply (UPS), or the like. A power converter 60, which may be a part of the power source 58 (as in the case of a UPS) or which may be separate from the back-up power source 58, converts the back-up power as noted in greater detail hereinafter. A detector 62 is coupled to the main power provided to the first set of contacts 52 and a control circuit 64, which may include a processor or other programmable device responsive to the detector 62, controls wipers 50a, 50b of the relay 50 to connect the LED driver(s) 22 to receive power selectively directly from the main power source 56 or from the back-up power source 58 and power converter 60. According to an embodiment, the detector 62 comprises any device operative to determine whether power is being provided by the main power source 56. The detector 62 may be a frequency detector, such as a digital or analog phase-locked loop, or a power detector, a voltage or current detector, or the like, or a combination thereof. In one embodiment, as long as power of appropriate magnitude and frequency is being provided by the utility company (or by another main power source 56) the relay 50 couples such power to the LED driver(s) 22. If one or more parameters of power from the utility company 56 or other source falls outside predetermined limits, or if such power disappears entirely, the detector 62 detects such condition, operates the wipers 50a, 50b of the relay 50 to disconnect the main power source 56 from the LED driver(s) 22 and to connect the power converter 60 thereto, and develops a signal to instruct the power converter 60 to develop appropriately conditioned power for the LED driver(s) 22. The LED driver(s) 22 are responsive to a parameter of the power delivered thereto to control the LED(s) in a desired fashion to conserve back-up power and/or indicate that the LEDs are receiving back-up power.

In the illustrated embodiment, the backup power source 58 comprises one or more batteries and the power converter 60 comprises a DC/AC power converter (or inverter) 70 as seen in FIG. 3A. Alternatively, the backup power source 58 may comprise a source of power other than a DC power source as noted above, in which case an AC-to-AC or other power converter may be employed.

In the illustrated embodiment, the DC/AC power converter 70 includes first and second controllable switches Q1, Q2, such as transistors, which may be of the insulated gate bipolar type (IGBT) or MOSFET or any another appropriate type. The switches may alternatively be triacs or another switching device. Additional pairs of switching devices may be provided to develop polyphase outputs, if desired. The controllable switches Q1, Q2 are coupled across conductors 80, 82 that receive the power from the one or more batteries and the switches Q1, Q2 are alternately operated by a transistor drive circuit 84 so as develop AC power across output conductors 86, 88. If necessary, discrete flyback diodes D1, D2 may be coupled across main current terminals of the transistors Q1, Q2 to provide a path for reactive currents and to limit voltage spikes resulting from switching of the devices Q1, Q2. An optional filter circuit 90 may convert the AC power developed across the conductors 86, 88 into a sinusoidal or near-sinusoidal waveform.

The transistor drive circuit 84 may operate the switches Q1, Q2 to produce AC power at a predetermined frequency or frequencies when the backup power source is active and providing power to the LED driver(s) 22. In one embodiment, the switches Q1, Q2 are operated to produce power at, for example, 70 hertz when the batteries are supplying power. In another embodiment, AC power at a first frequency (e.g., 80 hertz) may be supplied by the power converter 60 during a first time period following an interruption of main power and AC power at a second, different frequency (such as 70 hertz) may be supplied to the driver(s) 22 during a second period following the first time period. Power at one or more other frequencies may be supplied by the power converter 60 following the second period. As described in greater detail hereinafter, the LED driver(s) 22 are responsive to the frequency of the power delivered thereto, and operate the LEDs coupled thereto in accordance with such frequency. Thus, the frequency (or frequencies) of the AC power supplied to the LED driver(s) 22 serve as a command for the driver(s) 22. The command may be used to cause the driver(s) to shed loads over time, operate some LEDs in one fashion while other LEDs are operated in a different fashion, dim the LEDs in a manner that varies or does not vary over time, or the like.

Figure 4:
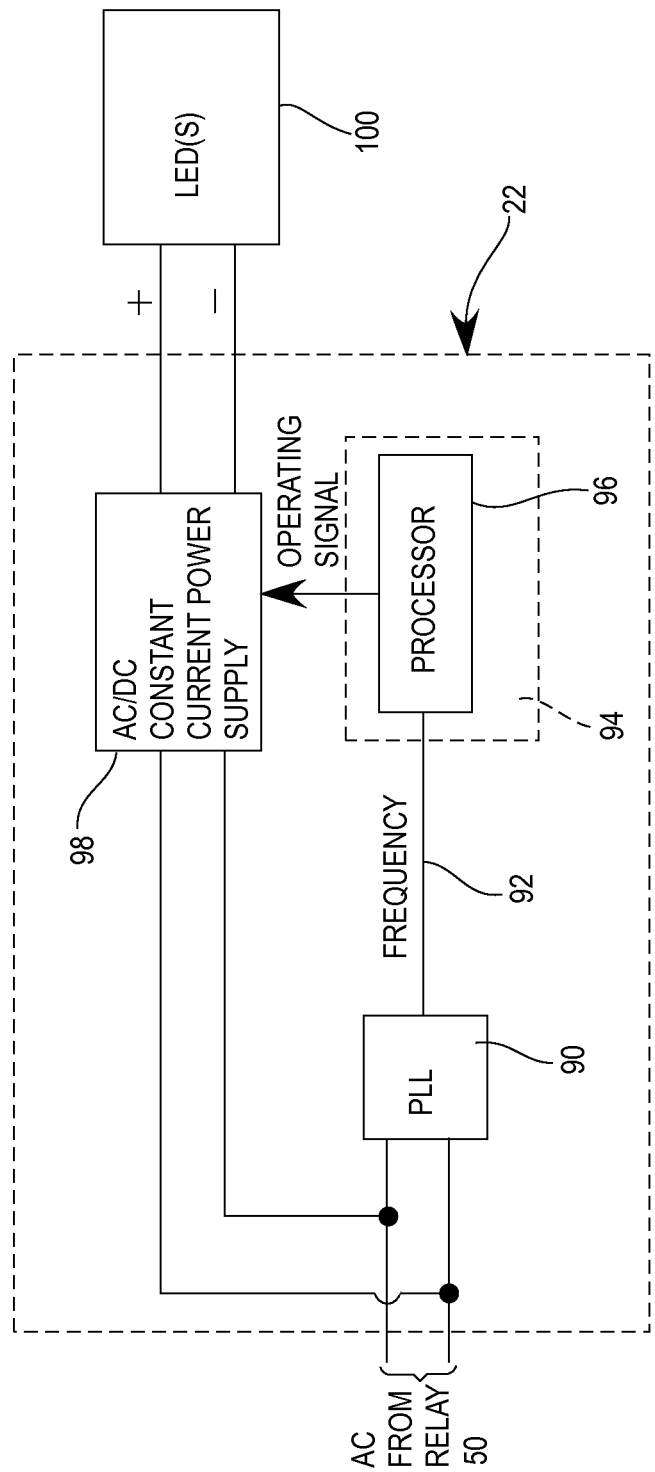
FIG. 4 is a block diagram illustrating the LED driver of FIG. 3 in greater detail.

FIG. 4 illustrates an embodiment of an LED driver 22 operable as noted above. The components and functions of the driver 22 seen in FIG. 4 may be implemented by a single programmable device, such as a microprocessor, or one or more of the various components and/or functions may be implemented by multiple devices, whether analog and/or digital. The driver 22 includes a frequency detector in the form of an analog or digital phase-locked loop (PLL) 90 that detects the frequency of the power supplied to the driver 22 and develops a signal indicative thereof on a line 92. The PLL 90 may comprise, for example, a zero cross PLL that counts the time between successive zero crossings of the power supplied to the driver 22. Alternatively, the PLL 90 may comprise a DQ type PLL, an analog PLL using a VCO, and/or may be single-phase or multiple-phase depending upon the number of phases of the main power. The PLL 90 and the driver 22 and/or other circuits described above or hereinafter may be implemented by analog and/or digital circuits, for example, by a single microcontroller or other programmable device. The signal on the line 92 is provided to a control 94 that may include a programmable element in the form of a microprocessor 96 that develops an operating signal (the microprocessor 96 may be dedicated solely to this function, or may implement one or more other functions of the driver 22 as noted above, such as those undertaken by the PLL 90). The operating signal is provided to an AC/DC constant current power supply 98 that develops and provides one of at least two outputs of appropriately conditioned power to LEDs 100 as described immediately hereinafter.

Figure 5:
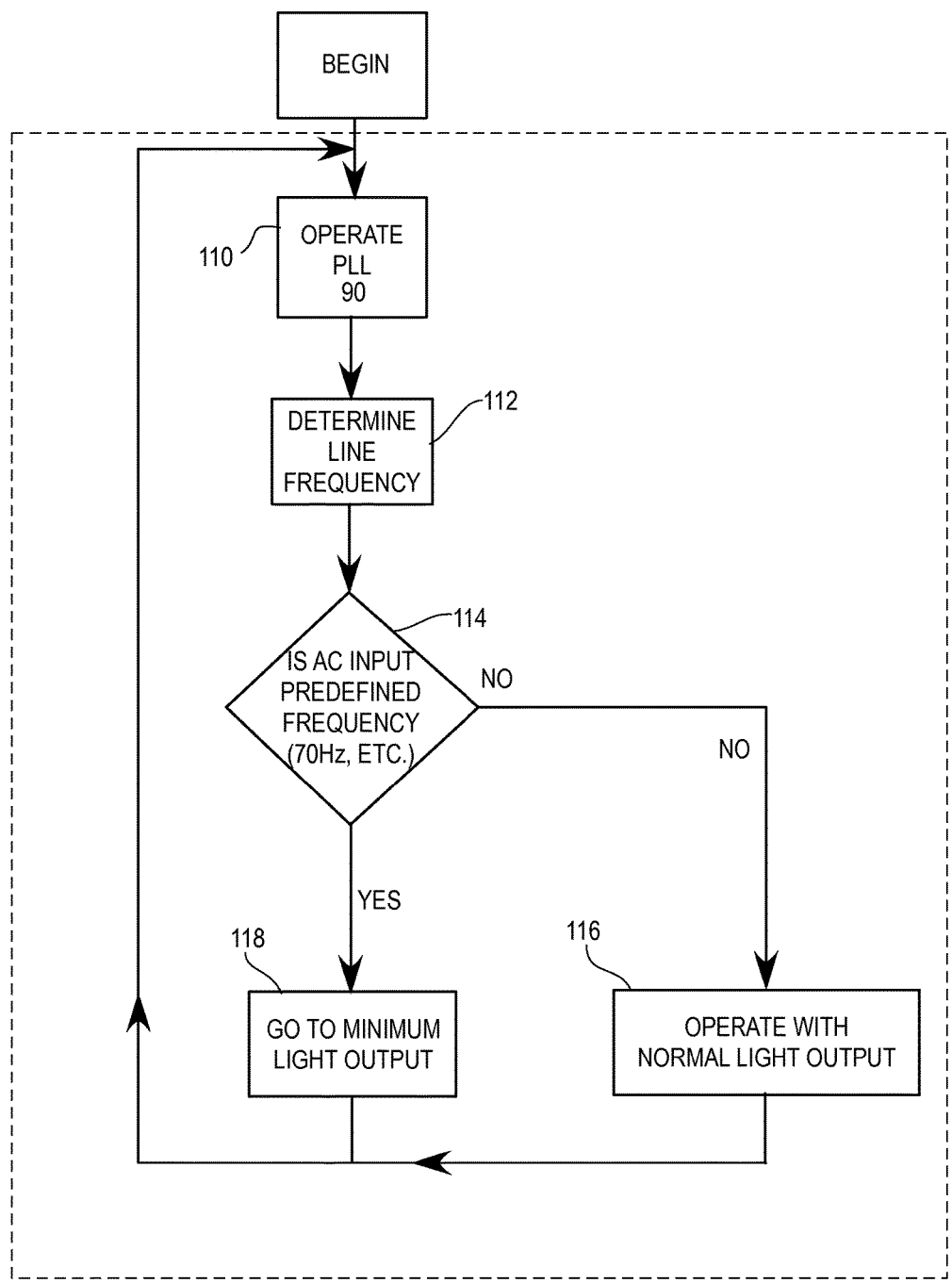
FIG. 5 is a flowchart illustrating operation of the control of FIG. 4.

FIG. 5 illustrates operation of the processor 96 and the control 94. Operation begins at a block 110 that operates the PLL 90 and a block 112 determines the frequency of the power supplied to the driver 22. A block 114 then checks to determine whether the frequency of such power is equal to the normal frequency of power supplied by a main power source (e.g., 60 hertz, which is the standard in the U.S.). If the power is at the normal frequency, then a block 116 operates the LEDs at full power output (i.e., no dimming). On the other hand, if the block 114 determines that the frequency of the power is not equal to the normal frequency, a block 118 causes the AC/DC constant current power supply 98 to develop and provide power resulting in maximum dimming of the LEDs. As noted above, a different step or steps could be undertaken during back-up power operation, if desired. For example, the color temperature or hue of one or more LEDs could be changed, one or more LEDs could be flashed on and off, one or more LEDs could be otherwise modulated, etc. The current source driver disclosed in U.S. patent application Ser. Nos. 14/292,286 and 14/292,332, both filed May 30, 2014, corresponding to U.S. Patent Application Publication Nos. 2015/0351187 and 2015/0351169, respectively, the disclosures of which are incorporated by reference herein may be used as the constant current power supply. Alternatively or in addition, the technology disclosed in U.S. Pat. No. 7,213,940, the disclosure of which is incorporated by reference herein, may be used herein to permit true white illumination to be produced in either or both of normal or back-up modes of operation. Still further, a parameter other than frequency of the power delivered to the driver(s) 22 could serve as an indication of normal/back-up power operation. In addition or alternatively, data may be sent via the power delivered to the driver(s) 22 to indicate or command operation in a particular mode. Control from the blocks 116, 118 returns to the block 110.

INDUSTRIAL APPLICABILITY

In summary, when main electrical power, for example, from a utility, is supplied to the driver(s) 22, the driver(s) 22 are configured to respond to such utility source frequency and operate the loads at maximum output.

If the power source switches from the utility to a back-up power source, the detector 62 detects such switching and the control circuit 64 operates the power converter 60 to cause the latter to deliver power to the driver(s) at a frequency different than the utility source frequency. In response, the control 94 may automatically operate the loads at a reduced output level in response to the different frequency. Thus, the loads consume less power when supplied with power from a backup power source than when supplied with power from a utility. Therefore, the backup power source may be able to supply power to the loads for a longer period than if the loads were operated at maximum output.

The present system integrates the supply of power to the driver(s) 22 and information regarding the source of such current into a single electrical waveform delivered from the controller 20 to the driver(s) 22. In addition to the lower power consumption when on backup power, a separate conductor is not required to be provided to the driver(s) 22 to supply information regarding the source of the power being supplied thereto.

The driver(s) 22 may be configured to select various output levels of the loads in accordance with the frequency of the power supplied thereto. For example, a driver 22 may operate the LEDs at 5% output when the power has a frequency of 70 hz, and operate the LEDs at 10% output when the power has a frequency of 80 hz. The same luminaire may be used in different environments, even if each such environment has a different minimum lighting requirement.

The system described herein may be used with other types of electrical loads. For example, the system may be used to switch operation of a computer automatically into an idle mode, reduce a speed of a fan, or reduce output of HVAC system when the power source switches from utility power to a back-up power source.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

I claim:

1. A load control system responsive to electric power from either a first power source or a second power source operable during first and second time periods, respectively, comprising:
   a first circuit responsive to the first and second power sources to develop power waveforms comprising different characteristics during the first and second time periods;
   a second circuit coupled to the first circuit and responsive to the characteristics of the power developed by the first circuit for developing first and second different outputs during the first and second time periods, respectively, wherein the first output operates at least one light emitting diode (LED) in a first operating mode, and the second output operates the at least one LED in a second operating mode different from the first operating mode; and
   wherein the first circuit switches between the first and second power sources in response to at least one of the characteristics of the power waveform developed by the first power source crossing a predetermined threshold.

2. The load control system of claim 1, wherein the first circuit develops power at first and second frequencies during the first and second time periods, respectively.

3. The load control system of claim 2, wherein the first output operates the LEDs in a fully energized mode and the second output operates the LEDs in a dimmed mode.

4. The load control system of claim 1, wherein the first power source comprises utility power and the second power source comprises a back-up source of power.

5. The load control system of claim 4, wherein the first and second outputs result in first and second load magnitude conditions, respectively, wherein the first load magnitude condition is greater than the second load magnitude condition.

6. The load control system of claim 1, wherein the second circuit is disposed in a luminaire comprising a plurality of LEDs operated by the second circuit.

7. The load control system of claim 6, wherein the second circuit comprises a frequency detector responsive to the power developed by the first circuit.

8. The load control system of claim 7, wherein the frequency detector comprises an analog phase locked loop.

9. The load control system of claim 8, wherein the frequency detector comprises a digital phase locked loop.

10. A load control system responsive to electric power from either a utility power source or a back-up power source operable during first and second time periods, respectively, comprising:
    a first circuit responsive to the utility and back-up power sources to develop power at first and second different frequencies during the first and second time periods, respectively; and
    a second circuit coupled to the first circuit and responsive to the different frequencies of the power developed by the first circuit for developing first and second outputs during the first and second time periods, respectively; and
    wherein the first circuit switches between the utility and back-up power sources in response to the second circuit detecting that the first frequency developed by the utility power source crosses a predetermined threshold.

11. The load control system of claim 10, wherein the first and second outputs operate a plurality of LEDs.

12. The load control system of claim 11, wherein the first and second outputs command first and second different LED operating conditions, respectively, wherein the first LED operating condition is greater than the second LED operating condition.

13. The load control system of claim 12, wherein the first circuit comprises a power converter and the second circuit operates the plurality of LEDs.

14. The load control system of claim 11, wherein the second circuit comprises a frequency detector responsive to the power developed by the first circuit.

15. The load control system of claim 14, wherein the frequency detector comprises an analog phase locked loop.

16. The load control system of claim 15, wherein the frequency detector comprises a digital phase locked loop.

17. A combination of a control circuit and an LED load operated by the control circuit, wherein the combination is responsive to electric power from either a utility power source or a back-up power source operable during first and second time periods, respectively, comprising:
    a first circuit responsive to the utility and back-up power sources to develop power at first and second different frequencies during the first and second time periods, respectively;
    a second circuit coupled to the first circuit and responsive to the frequency of the power developed by the first circuit for developing first and second outputs, respectively; and
    a plurality of LEDs coupled to the second circuit, energized by the first and second outputs, and developing a brightness dependent upon the outputs; and
    wherein the first circuit switches between the utility and back-up power sources in response to the second circuit detecting that the first frequency developed by the utility power source crosses a predetermined threshold.

18. The combination of claim 17, wherein the first circuit comprises a power converter.

19. The combination of claim 18, wherein the second circuit is disposed in a luminaire that comprises the plurality of LEDs.

20. The combination of claim 19, wherein the second circuit comprises a frequency detector responsive to the power developed by the first circuit.

21. The combination of claim 20, wherein the frequency detector comprises an analog phase locked loop.

22. The combination of claim 21, wherein the frequency detector comprises a digital phase locked loop.

* * * * *